(12) United States Patent
Struik (10) Patent No.: US 7,334,127 B2
(45) Date of Patent: Feb. 19, 2008

(54) KEY AGREEMENT AND TRANSPORT PROTOCOL

(75) Inventor: Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 493 days.

(21) Appl. No.: 10/440,486

(22) Filed: May 16, 2003

(65) Prior Publication Data

US 2004/0081321 A1   Apr. 29, 2004

Related U.S. Application Data

(63) Continuation-in-part of application No. PCT/CA03/00317, filed on Mar. 7, 2003, and a continuation-in-part of application No. 10/092,972, filed on Mar. 8, 2002, now Pat. No. 7,243,232, which is a continuation-in-part of application No. 08/426,090, filed on Apr. 21, 1995, now Pat. No. 6,487,661.

(51) Int. Cl.
*H04L 9/00* (2006.01)

(52) U.S. Cl. .................. 713/168; 713/169; 713/171; 713/176; 713/180; 713/181; 380/30; 380/259; 380/262; 380/277; 380/282; 380/283

(58) Field of Classification Search .............. 380/277, 380/278, 28, 30, 259, 262, 282, 283; 713/168, 713/169, 171, 176, 180, 181
See application file for complete search history.

(56) References Cited

U.S. PATENT DOCUMENTS

| | | | |
|---|---|---|---|
| 4,200,770 A | 4/1980 | Hellman et al. | |
| 4,956,863 A * | 9/1990 | Goss | 380/30 |
| 5,586,186 A | 12/1996 | Yuval et al. | |
| 5,600,725 A * | 2/1997 | Rueppel et al. | 380/30 |
| 5,761,305 A * | 6/1998 | Vanstone et al. | 713/171 |
| 5,889,865 A | 3/1999 | Vanstone et al. | |
| 5,896,455 A | 4/1999 | Vanstone et al. | |

(Continued)

FOREIGN PATENT DOCUMENTS

DE   39 15262 A1   11/1989

(Continued)

OTHER PUBLICATIONS

Colin Boyd, Design and Analysis of Key Exchange Protocols via Secure Channel Identification, Advances in Cryptology—ASIACRYPT 1994.*

(Continued)

*Primary Examiner*—Kim Vu
*Assistant Examiner*—Beemnet W Dada
(74) *Attorney, Agent, or Firm*—John R. S. Orange; Brett J. Slaney; Blake, Cassels & Graydon LLP (57) ABSTRACT

A key establishment protocol includes the generation of a value of cryptographic function, typically a hash, of a session key and public information. This value is transferred between correspondents together with the information necessary to generate the session key. Provided the session key has not been compromised, the value of the cryptographic function will be the same at each of the a correspondents. The value of the cryptographic function cannot be compromised or modified without access to the session key.

22 Claims, 8 Drawing Sheets

U.S. PATENT DOCUMENTS

| | | |
|---|---|---|
| 6,122,736 A | 9/2000 | Vanstone et al. |
| 6,487,661 B2 | 11/2002 | Vanstone et al. |

FOREIGN PATENT DOCUMENTS

| | | |
|---|---|---|
| EP | 0 393 806 A2 | 10/1990 |
| EP | 0 639 907 A1 | 2/1995 |
| EP | 0 661 844 A2 | 7/1995 |
| EP | 0 739 105 A1 | 10/1996 |
| EP | 0 739 106 A1 | 10/1996 |
| EP | 0 977 396 A2 | 2/2000 |
| EP | 1 282 260 A1 | 2/2003 |
| WO | WO 96 33566 A1 | 10/1996 |
| WO | WO 98 18234 A1 | 4/1998 |
| WO | WO 99 57844 A1 | 11/1999 |

OTHER PUBLICATIONS

Whitfield Diffie, Authentication and Authenticated Key Exchange, Designs, Codes and Cryptography, Mar. 6, 1992.*

Boyd, C., & Mao, W., Design and Analysis of Key Exchange Protocols via Secure Channel Identification, Advances in Cryptography—ASIACRYPT '94, 1994, pp. 171-181.

Diffie, W., Van Oorschot, P.C., & Wiener, M.J., Authentication and Authenticated Key Exchanges, Designs, Codes and Cryptography, 1992, pp. 107-125, 2.

Horster, P., Petersen, H., & Miches, M., Meta-ElGamal signature schemes, Proceedings of the 2nd ACM Conference on Computer and Communications Security, Association of Computing Machinery, 1994, pp. 96-107.

Horster, P., Petersen, H., & Michels, M., Meta-Message Recovery and Meta-Blind Signature Schemes Based on the Discrete Logarithm Problem and Their Applications, Advances in Cryptology-ASIACRYPT'94 (LNCS 917), 1995, pp. 224-237.

Krawczyk, H., Skeme: A Versatile Secure Key Exchange Mechanism for Internet, Network and Distributed System Security, 1996, Proceedings of the Symposium on San Diego, CA, USA, pp. 114-127.

Matsumoto, T. Takashima, Y., & Imai, H., On Seeking Smart Public-Key-Distribution Systems, The Transactions of the IECE of Japan, 1986, pp. 99-105, vol. E69. No. 2.

Menezes, Oorchot, Vanstone, Handbook of Applied Cryptography, CRC Press Series on Discrete Mathematics and its Applications, 1997, pp. 402, 499.

Nyberg, K. & Rueppel, R., Message Recovery for Signature Schemes Based on the Discrete Logarithm Problem, Springer-Verlag, 1998.

* cited by examiner

KEY AGREEMENT AND TRANSPORT PROTOCOL

This application is a continuation-in-part of PCT International Application No. PCT/CA03/00317 filed on Mar. 7, 2003, and a continuation-in-part of U.S. application Ser. No. 10/092,972 filed on Mar. 8, 2002 now U.S. Pat. No. 7,243,232, which is a continuation-in-part of U.S. application Ser. No. 08/426,090 filed Apr. 21, 1995 now U.S. Pat. No. 6,487,661.

The present invention relates to key agreement protocols for transfer and authentication of encryption keys.

To retain privacy during the exchange of information it is well known to encrypt data using a key. The key must be chosen so that the correspondents are able to encrypt and decrypt messages but such that an interceptor cannot determine the contents of the message.

In a secret key cryptographic protocol, the correspondents share a common key that is secret to them. This requires the key to be agreed upon between the correspondents and for provision to be made to maintain the secrecy of the key and provide for change of the key should the underlying security be compromised.

Public key cryptographic protocols were first proposed in 1976 by Diffie-Hellman and utilized a public key made available to all potential correspondents and a private key known only to the intended recipient. The public and private keys are related such that a message encrypted with the public key of a recipient can be readily decrypted with the private key but the private key cannot be derived from the knowledge of the plaintext, ciphertext and public key.

Key establishment is the process by which two (or more) parties establish a shared secret key, called the session key. The session key is subsequently used to achieve some cryptographic goal, such as privacy. There are two kinds of key agreement protocol; key transport protocols in which a key is created by one party and securely transmitted to the second party; and key agreement protocols, in which both parties contribute information which jointly establish the shared secret key. The number of message exchanges required between the parties is called the number of passes. A key establishment protocol is said to provide implicit key authentication (or simply key authentication) if one party is assured that no other party aside from a specially identified second party may learn the value of the session key. The property of implicit key authentication does not necessarily mean that the second party actually possesses the session key. A key establishment protocol is said to provide key confirmation if one party is assured that a specially identified second party actually has possession of a particular session key. If the authentication is provided to both parties involved in the protocol, then the key authentication is said to be mutual if provided to only one party, the authentication is said to be unilateral.

There are various prior proposals which claim to provide implicit key authentication.

Examples include the Nyberg-Rueppel one-pass protocol and the Matsumoto-Takashima-Imai (MTT) and the Goss and Yacobi two-pass protocols for key agreement.

The prior proposals ensure that transmissions between correspondents to establish a common key are secure and that an interloper cannot retrieve the session key and decrypt the ciphertext. In this way security for sensitive transactions such as transfer of funds is provided.

For example, the MTI/A0 key agreement protocol establishes a shared secret K, known to the two correspondents, in the following manner:

1. During initial, one-time setup, key generation and publication is undertaken by selecting and publishing an appropriate system prime p and generator $\alpha \in Z_p^*$ in a manner guaranteeing authenticity. Correspondent A selects as a long-term private key a random integer "a", $1 \leq a \leq p-2$, and computes a long-term public key $z_A = \alpha^a \bmod p$. B generates analogous keys b, $z_B$. A and B have access to authenticated copies of each others long-term public key.

2. The protocol requires the exchange of the following messages.

$$A \to B : \alpha^x \bmod p \quad (1)$$

$$A \leftarrow B : \alpha^y \bmod p \quad (2)$$

The values of x and y remain secure during such transmissions as it is impractical to determine the exponent even when the value of $\alpha$ and the exponentiation is known provided of course that p is chosen sufficiently large.

3. To implement the protocol the following steps are performed each time a shared key is required.
 (a) A chooses a random integer $x, 1 \leq x \leq p-2$, and sends B message (1) i.e. $\alpha^x \bmod p$.
 (b) B chooses a random integer $y, 1 \leq y \leq p-2$, and sends A message (2) i.e. $\alpha^y \bmod p$.
 (c) A computes the key $K = (\alpha^y)^a z_B^x \bmod p$.
 (d) B computes the key $K = (\alpha^x)^b z_A^y \bmod p$.
 (e) Both share the key $K - \alpha^{bx+ay}$.

In order to compute the key E, A must use his secret key a and the random integer x, both of which are known only to him. Similarly B must use her secret key b and random integer y to compute the session key K Provided the secret keys a,b remain uncompromised, an interloper cannot generate a session key identical to the other correspondent. Accordingly, any ciphertext will not be decipherable by both correspondents.

As such this and related protocols have been considered satisfactory for key establishment and resistant to conventional eavesdropping or man-in-the-middle attacks.

In some circumstances it may be advantageous for an adversary to mislead one correspondent as to the true identity of the other correspondent.

In such an attack an active adversary or interloper E modifies messages exchanged between A and B, with the result that B believes that he shares a key K with E while A believes that she shares the same key K with B. Even though E does not learn the value of K the misinformation as to the identity of the correspondents may be useful.

A practical scenario where such an attack may be launched successfully is the following. Suppose that B is a bank branch and A is an account holder. Certificates are issued by the bank headquarters and within the certificate is the account information of the holder. Suppose that the protocol for electronic deposit of finds is to exchange a key with a bank branch via a mutually authenticated key agreement Once B has authenticated the transmitting entity, encrypted funds are deposited to the account number in the certificate. If no further authentication is done in the encrypted deposit message (which might be the case to save bandwidth) then the deposit will be made to E's account.

It is therefore an object of the present invention to provide a protocol in which the above disadvantages are obviated or mitigated.

Accordingly, in one aspect, there is provided a method of a first correspondent authenticating a second correspondent in a data communication system, the method comprising the steps of: a) the first correspondent generating a first value $G_A$, and sending the first value to the second correspondent; b) the first correspondent obtaining a shared key K; c) the first correspondent receiving from the second correspondent: i) a first keyed hash the first value, a second value $G_B$ generated by the second correspondent, and identification information of the first correspondent using the shared key K; ii) the identification information; and iii) the second value; d) the first correspondent computing a first verification keyed hash of the first and second values and the identification information of the first correspondent using the shared key K; and e) the first correspondent verifying that the first keyed hash is equal to the first verification keyed hash.

In another aspect, there is provided a method of authenticated key agreement between a first and second correspondent in a data communication system, each of the correspondents having a public and private key pair in a public key encryption system, the method comprising the steps of: a) the first correspondent generating a first value $G_A$, and sending the first value to the second correspondent; b) the first correspondent computing a shared key K from public information of the second correspondent and information that is private thereto c) the first correspondent receiving from the second correspondent: i) a first keyed hash the first value, a second value $G_B$ generated by the second correspondent, and identification information of the first correspondent using the shared key K; ii) the identification information; and iii) the second value; d) the first correspondent computing a first verification keyed hash of the first and second values and the identification information of the first correspondent using the shared key K; and c) the first correspondent verifying that the first keyed hash is equal to the first verification keyed hash.

In yet another aspect, a correspondent comprising a cryptographic unit and a computer readable medium having computer executable instructions thereon is provided for causing the correspondent to perform the above methods.

In yet another aspect, a data communication system is provided comprising: a first correspondent comprising a first cryptographic unit for performing cryptographic operations; and a first computer readable medium having computer readable instructions thereon for: a) enabling the first correspondent to generate a first value and send the first value to a second correspondent; b) enabling the first correspondent to obtain a shared key; c) enabling the first correspondent to receive from the second correspondent: i) a first keyed hash of the first value, a second value generated by the second correspondent, and identification information of the first correspondent using the shared key; ii) the identification information of the first correspondent; and iii) the second value; d) causing the first cryptographic unit to compute a first verification keyed hash of the first and second values and the identification information of the first correspondent using the shared key; e) causing the first correspondent to verify that the first keyed hash is equal to the first verification keyed hash; B causing the first cryptographic unit to compute a second keyed hash of the first and second values and identification information of the second correspondent; and g) causing the first correspondent to send the second keyed hash and the identification information of the second correspondent to the second correspondent; and a second correspondent comprising a second cryptographic unit for performing cryptographic operations; and a second computer readable medium having computer readable instructions thereon for: h) causing the second correspondent to compute a second verification keyed hash of the first and second values and identification information of the second correspondent; and i) causing the second correspondent to verify that the second verification keyed hash is equal to the second keyed hash.

As the session key K can only be generated using information that is private to either A or B, the binding of K with δ with the cryptographic function h prevents E from extracting K or interjecting a new value function that will correspond to that obtained by A.

Embodiments of the invention will now be described by way of example only with reference to the accompanying drawings in which.

Figure 1:
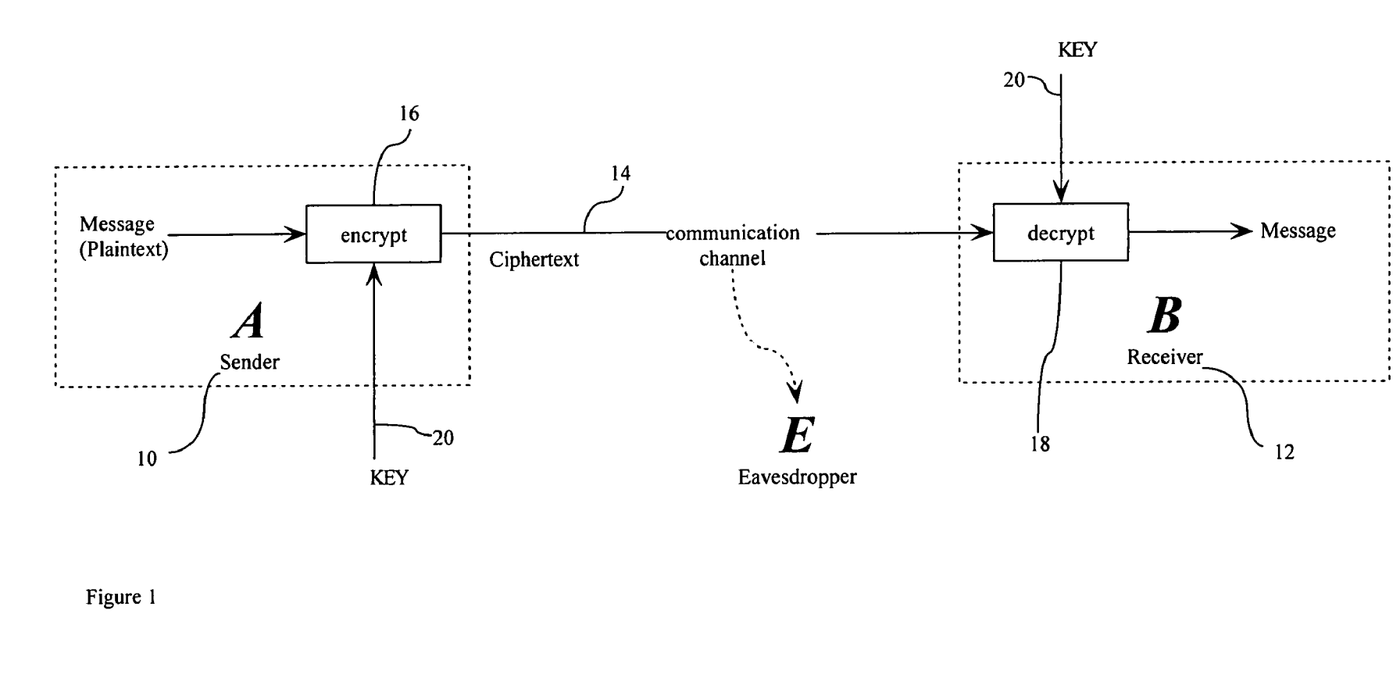
FIG. 1 is a schematic representation of a data communication system.

Referring therefore to FIG. 1, a pair of correspondents, 10,12, denoted as correspondent A and correspondent B, exchange information over a communication channel 14. A cryptographic unit 16,18 is interposed between each of the correspondents 10,12 and the channel 14. A key 20 is associated with each of the cryptographic units 16,18 to convert plaintext carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. Implementations are shown schematically in FIGS. 2 through 7.

Figure 2:
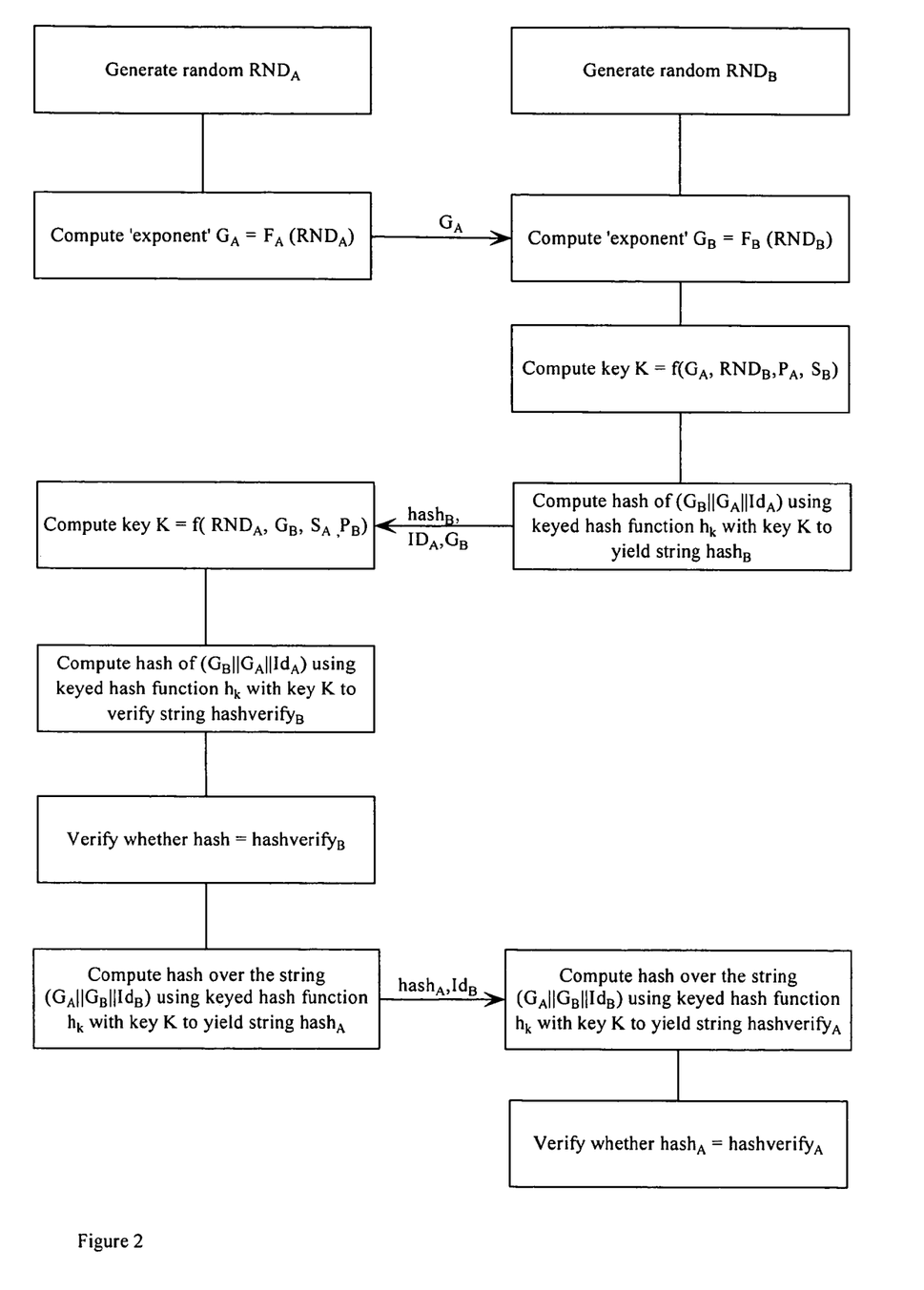
FIGS. 2 through 8 are schematic representations of implementations of different protocols.

Referring to FIG. 2, a mutual public key authenticated key agreement protocol is complemented been a correspondent A shown on the left hand side of the figure and a correspondent B shown on the right hand side, Correspondent A has a public-private key pair $P_A, S_A$ respectively and similarly correspondent B has a public private Key pair $P_B, S_B$.

As a first step, correspondent A generates a session private key as a random number $RND_A$ and computes a corresponding public session key $G_A = F_A(RND_A)$. The function $F_A$ is a cryptographic one way function, typically an exponention by the group generator, such as a point multiplication in an elliptic curve cryptosystem.

The public session key $G_A$ is forwarded to correspondent B who generates corresponding parameters of a session private key $RND_B$ and a public session key $G_B$.

The correspondent B computes a session key K as a function of A's public information $G_A, P_A$ AND B's private information $RND_B, S_B$. A corresponding key K' can be computed by A using the private information of A and the public information of B namely $f(RD_A, G_B, S_A, P_B)$.

After correspondent B has generated the key K, he compiles a string $(G_A \| G_B \| Id_A)$ where $Id_A$ is a string that identifies A. The concatenated string is hashed with a cryptographic function $h_k$ which is a keyed hash function that uses the key K to yield a string $hash_B$.

The string $hash_B$ is forwarded to correspondent A together with $Id_A$ and $G_B$.

Upon receipt of the message from B, correspondent A computes the key K' as described above. Correspondent A also computes a hash, hashverify$_B$ from the string (G$_B$//G$_A$//Id$_A$) using the hash function keyed by the key K'. Correspondent A checks that the hashes verify to confirm the identity of the keys K,K'.

Correspondent A then computes a hash h$_{K'}$ using the key K' on the string (G$_A$//G$_B$//Id$_B$) and forwards that together with Id$_B$ of correspondent B. Correspondent B similarly computes a hashverify$_A$ using the keyed hash function h$_K$ using the key K on the same sting and verifies that hash$_A$=hashverify$_A$.

Figure 3:
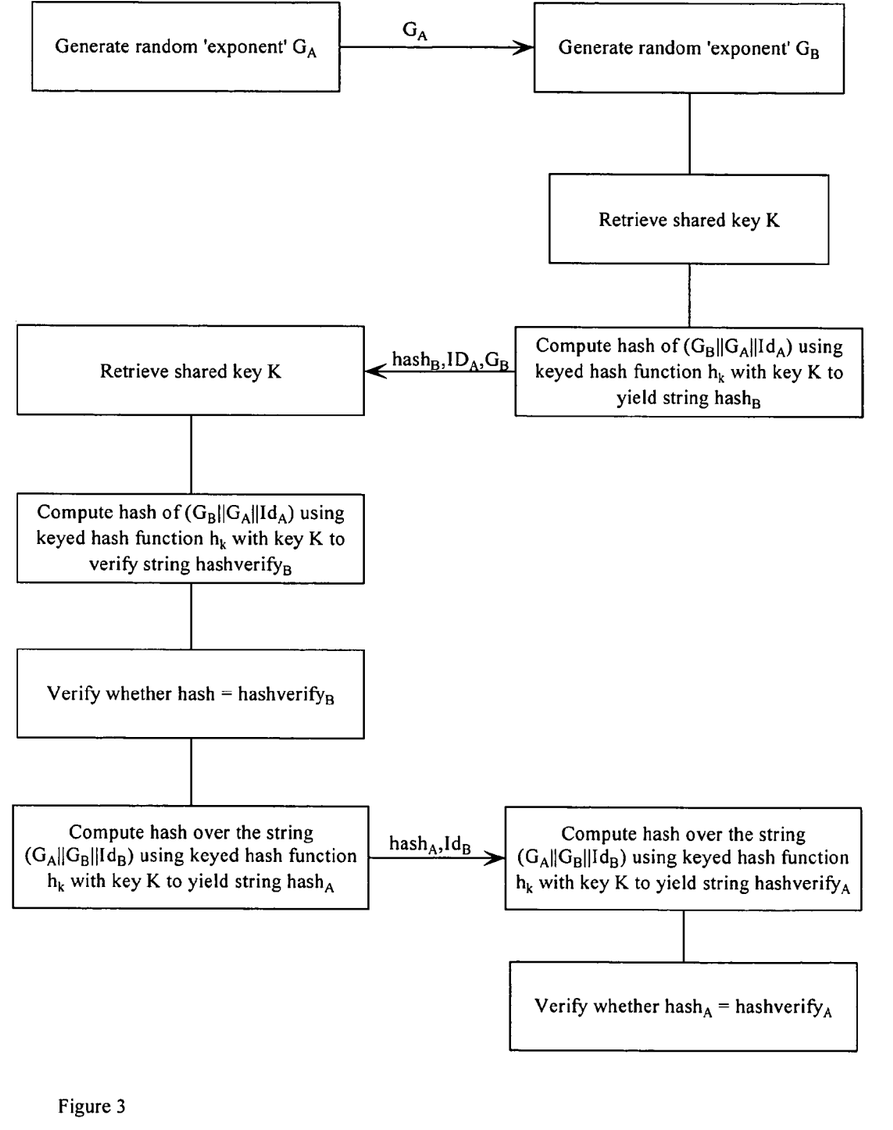

A similar protocol is shown in FIG. 3 to implement a mutual entity authentication protocol. In this protocol the correspondents share a key K obtained over a secure channel. The correspondents A,B, each generate a random integer which is used as the session public key of A and B respectively. Thereafter the exchange of information and verification proceeds as above with respect to FIG. 2 with the sled secret key being utilised in the keyed hash functions.

Figure 4:
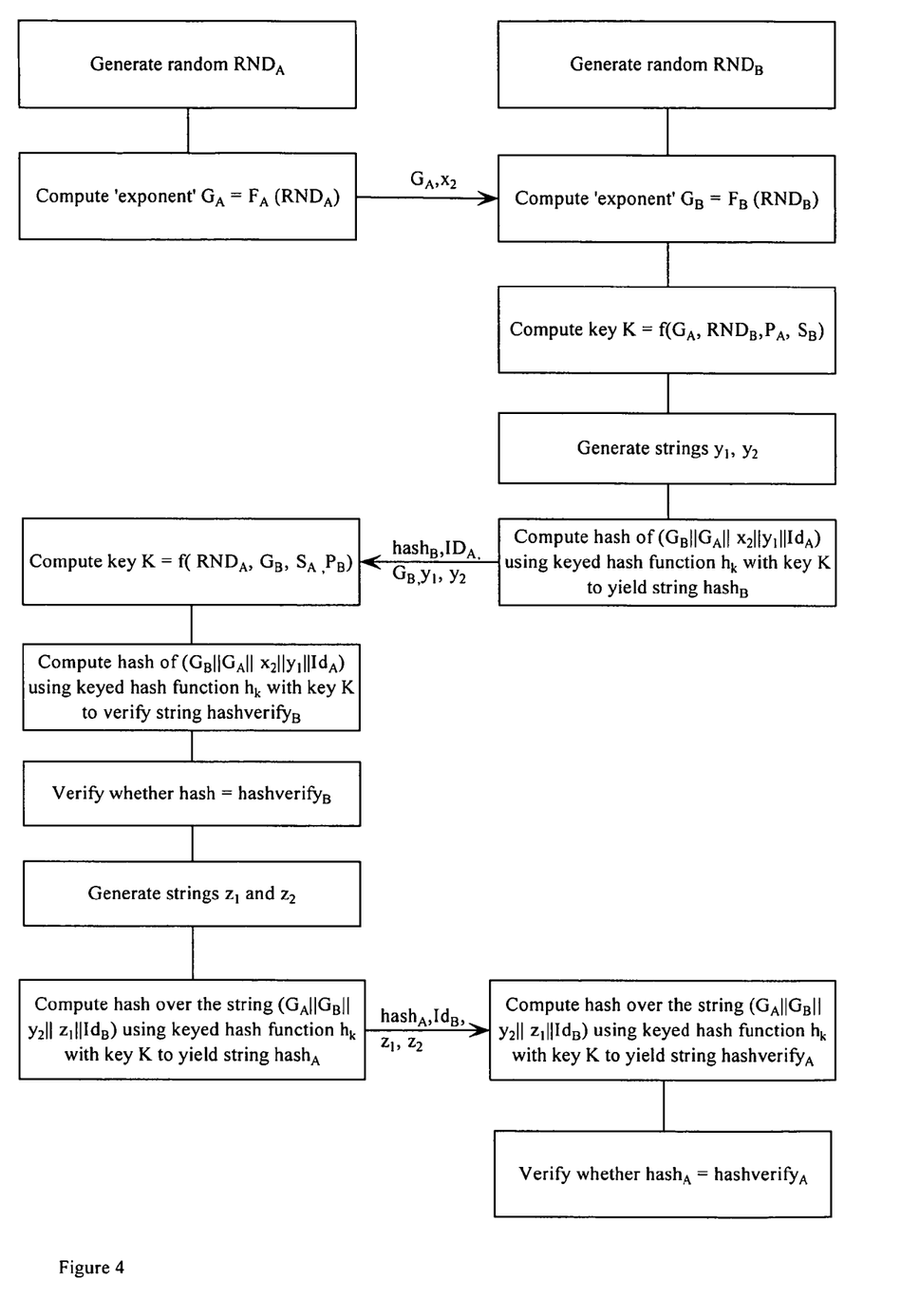

A full mutual public key authenticated key exchange protocol is shown in FIG. 4. An initial exchange of the public keys P$_A$,P$_B$ is performed over an authenticated channel followed by the exchange of information as shown in the protocol of FIG. 4. In this case the correspondent A sends G$_A$ computed as described above with respect to FIG. 2, together with a string x$_2$ that A wants confirmation of receipt by B. Correspondent B computes the key K as in FIG. 2 and also generates a pair of strings y$_1$,y$_2$ which B wants to have authenticated by A and receipt confirmed by A respectively. The strings are sent to A with the hash hash$_B$ and identity Id$_A$. The hash hash$_B$ is performed on a string including the message x$_2$ and the string y$_1$ to be authenticated.

Correspondent A computes the key K and verifies the hash as before. This also confirms receipt of x$_2$ by B.

Correspondent A in turn generates strings z$_1$,z$_2$ where z$_1$ is a string that A wants authenticated by B and z$_2$ is a string that may be used in a subsequent execution of the protocol described below, The stings, z$_1$ and y$_2$ together with the identifying information of B, Id$_B$, are included in the string that is hashed with the key K to provide the string hash$_A$. This is sent together with the identity of B and the strings z$_1$,z$_2$ to the correspondent B who can verify the hashes as before, thereby confirming receipt of y$_2$ and authentication of z$_1$ by the correspondent A.

Thus information is exchanged in an authenticated manner and a common key obtained that allows subsequent exchange of correspondence on a secure channel.

With the protocol described in FIG. 4 it is possible to implement a mutual public key authenticated key agreement protocol by letting the strings x$_2$,y$_1$, y$_2$,z$_1$,z$_2$ all be empty strings. Alternatively, a mutual public key authenticated key agreement protocol with implicit key agreement can be implemented by using x$_2$ as a string that is assumed to represent E$_K$(k), the result of applying an encryption function E with key K on the value of k. Correspondent B can compute the value of K and hence retrieve the notional value of k from the string. He can use this as his shared session key with the correspondent A. The value of y$_1$ may be used to represent E$_K$(k$_{21}$) and z$_1$ as E$_K$(k$_{12}$) where k$_{21}$ and k$_{12}$ are different keys for communication or other secret information to be shared between the correspondents. In this case y$_2$ and z$_2$ are empty strings. In this way there is a key agreement on a shared key K$_{AB}$ together with authenticated key transport of the keys k$_{21}$ and k$_{12}$ between the correspondents and authenticated key agreement on k. Moreover, if additional information is provided in the string x$_2$ and y$_2$ then confirmation of proper receipt is also obtained.

Figure 5:
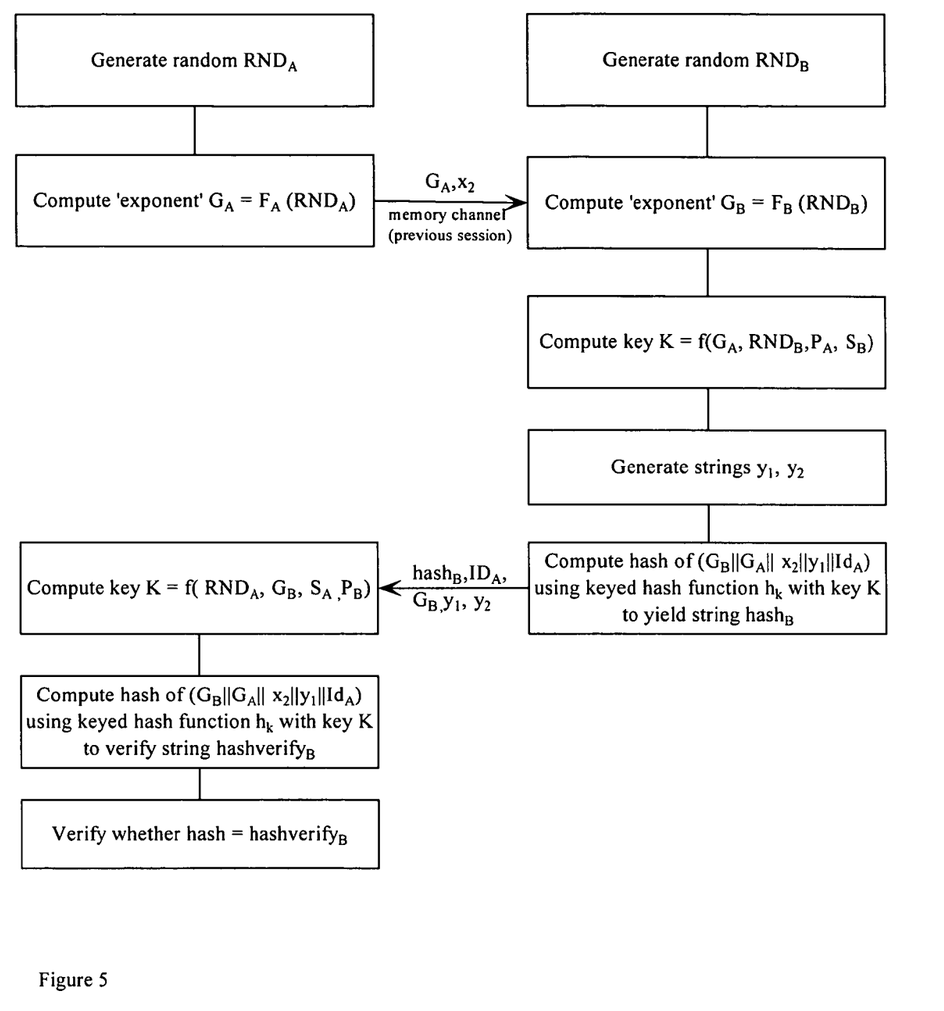

The protocol of FIG. 4 may also be used to increase efficiency in successive sessions by using the string z$_2$ to pass the information exchanged in the first pass of the next session. Thus as shown in FIG. 5, the string G$_A$,x$_2$ is sent as z$_2$ in the previous session. The protocol then proceeds from correspondent B as before. As seen in FIG. 5, the third transmission may be optionally omitted. Correspondent B may also take advantage of this facility by including the information G$_B$,y$_1$ for the next session in the exchange as y$_2$.

Figure 6:
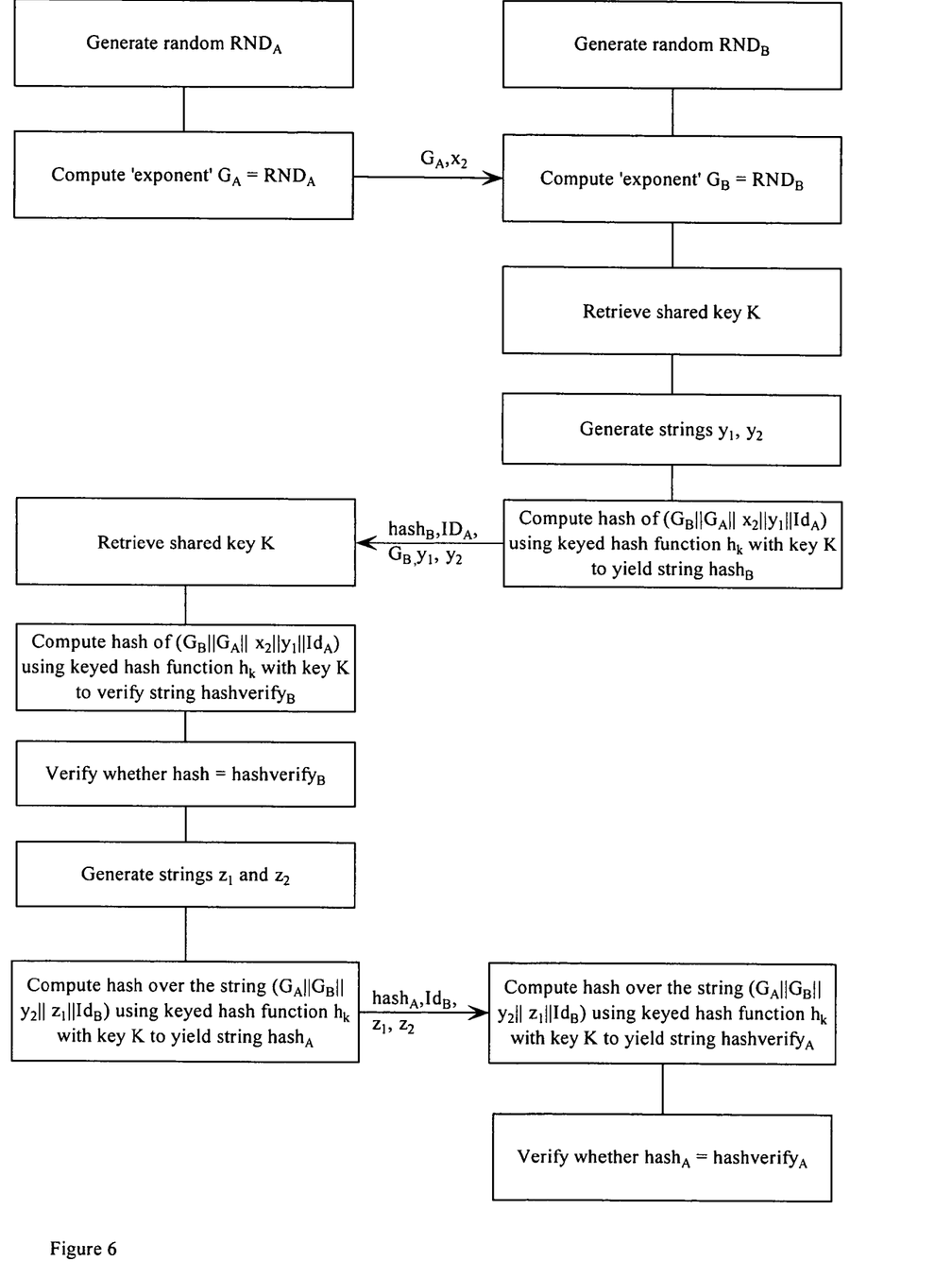

The mutual public key authenticated key agreement protocol may also be adapted for entity authentication implementations as shown in FIG. 6. In this case, as in FIG. 3 above, the key generation is omitted as the correspondents have a shared key obtained over a secure channel.

Figure 7:
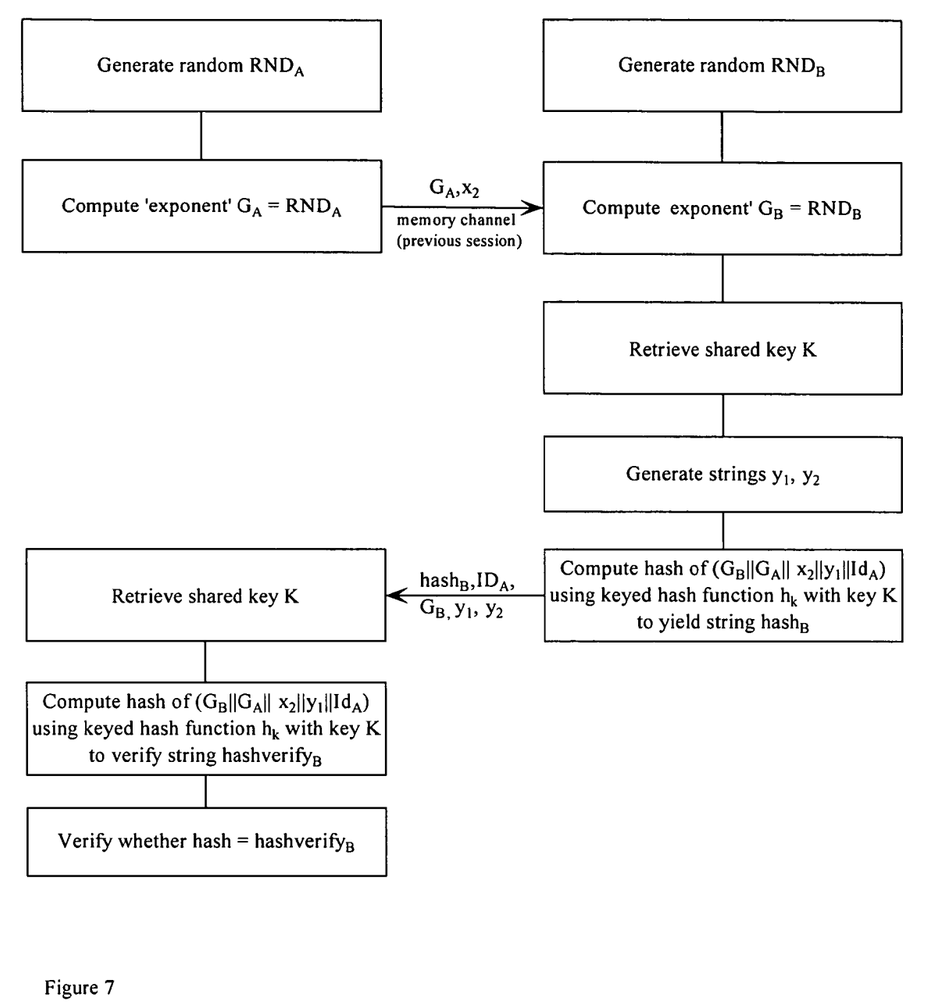

Similarly, the protocol of FIG. 6 may be modified as illustrated in FIG. 7 to take advantage of the exchange of information in a previous session, similar to that of FIG. 5.

It will be seen therefore that a number of versatile and flexible protocols can be developed from the general protocol to meet particular needs. These protocols may implement elliptic curve cryptography or operate in $Z_p$ as preferred.

It can be readily seen that the message flows of the public-key authenticated key agreement protocol depicted in FIG. 3 and those of the entity authentication protocol depicted in FIG. 2 have identical structure, Moreover, the computation of the hash values hashA and hashb by correspondent A and B respectively, as well as the verification thereof, take strings with an identical structure as input. In fact, both protocols only differ in the way the key K used in the protocol is derived. Thus, a combined implementation of both protocols may take advantage of a common handling of telecommunication flows, including messaging, error handling and the-like, and may take advantage of a common handling of the key confirmation steps (i.e., generation and processing of hash values).

A similar reasoning holds for the message flows and processing steps of the public-key authenticated key agreement protocol depicted in FIG. 4 and the version thereof depicted in FIG. 5. It will be appreciated that the latter consists of executing only part of the former. A similar remark holds for the entity authentication protocol depicted in FIG. 6 and the one depicted in FIG. 7. It should also be noted that the augmented public-key authenticated key agreement protocol depicted in FIG. 4 can be used to implement the one depicted in FIG. 3 and that, similarly, the augmented entity authentication protocol depicted in FIG. 6 can be used to implement the one depicted in FIG. 2. Thus, all the protocols described can be implemented with largely common routines to handle telecommunication and message flows and with a large degree of commonality of the implementation of the protocol steps of each and every one of the protocols.

It will be appreciated that although the invention has been described with reference public key based agreement protocols and entity authentication protocols, it may equally be utilized on symmetric key agreement protocols. In such an embodiment, the computation of the shared key K may be performed using a master key K$_m$ as one input to a keyed hash function. A concatenation of the ephemeral keys G$_A$, G$_B$, is used as the other input and the resultant output is used as the shared key K.

Figure 8:
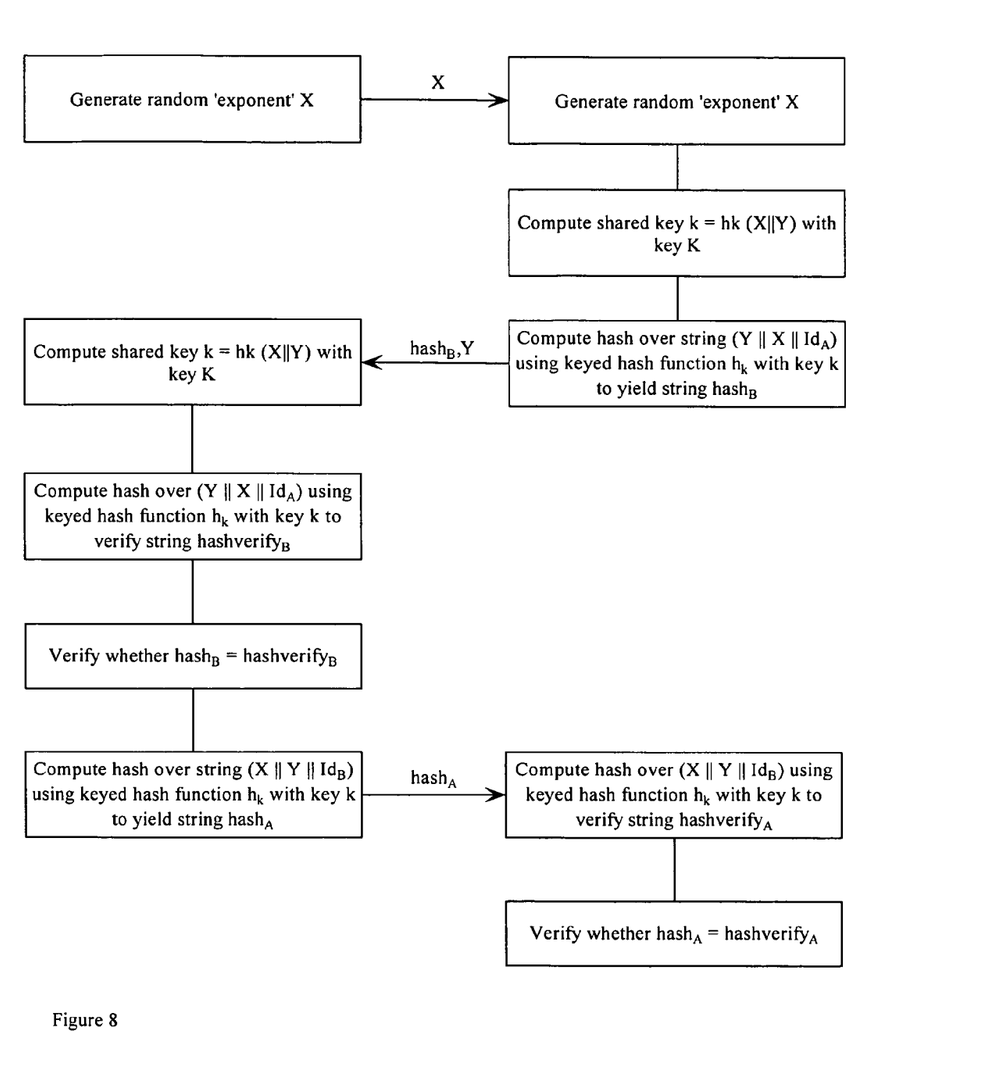

Such an arrangement is shown in FIG. 8.

I claim:

1. A method of a first correspondent authenticating a second correspondent in a data communication system, the method comprising the steps of:
   a) said first correspondent generating a first value $G_A$, and sending said first value to said second correspondent;
   b) said first correspondent obtaining a shared key K;
   c) said first correspondent receiving from said second correspondent; i) a first keyed hash of said first value, a second value $G_B$ generated by said second correspondent, and identification information of said first correspondent using said shared key K; ii) said identification information of said first correspondent; and iii) said second value;
   d) said first correspondent computing a first verification keyed hash of said first and second values and said identification information of said first correspondent using said shared key K; and
   e) said first correspondent verifying that said first keyed hash is equal to said first verification keyed hash.

2. The method according to claim 1, further comprising the steps of:
   f) said first correspondent computing a second keyed hash of said first and second values and identification information of said second correspondent using said shared key K; and
   g) said first correspondent sending said second keyed hash and said identification information of said second correspondent to said second correspondent to enable said second correspondent to compute a second verification keyed hash of said first and second values and identification information of said second correspondent using said shared key K and to verify that said second verification keyed hash is equal to said second keyed hash.

3. A method of authenticated key agreement between a first and second correspondent in a data communication system, each of said correspondents having a public and private key pair in a public key encryption system, said method comprising the steps of:
   a) said first correspondent generating a first value $G_A$, and sending said first value to said second correspondent;
   b) said first correspondent computing a shared key K from public information of said second correspondent and information that is private thereto;
   c) said first correspondent receiving from said second correspondent: i) a first keyed hash of said first value, a second value $G_B$ generated by said second correspondent, and identification information of said first correspondent using said shared key K; ii) said identification information of said first correspondent; and iii) said second value;
   d) said first correspondent computing a first verification keyed hash of said first and second values and said identification information of said first correspondent using said shared key K; and
   e) said first correspondent verifying that said first keyed hash is equal to said first verification keyed hash.

4. The method according to claim 3, further comprising the steps of:
   f) said first correspondent computing a second keyed hash of said first and second values and identification information of said second correspondent using said shared key K; and
   g) said first correspondent sending said second keyed hash and said identification information of said second correspondent to said second correspondent to enable said second correspondent to compute a second verification keyed hash of said first and second values and identification information of said second correspondent using said shared key K and to verifying verify that said second verification keyed hash is equal to said second keyed hash.

5. The method according to claim 2 further comprising:
   h) said second correspondent computing said second verification keyed hash; and
   i) said second correspondent verifying that said second verification keyed hash is equal to said second keyed hash.

6. The method according to claim 1, wherein said shared key is computed using a combination of a first random exponent generated by said first correspondent and a second random exponent received from said second correspondent.

7. The method according to claim 6, wherein said combination includes a concatenation of said first and second random exponents and said shared key is computed by hashing said concatenation.

8. The method according to claim 1, wherein said first keyed hash is computed over a string generated by concatenating said first value, said second value, and said identification information of said first correspondent.

9. The method according to claim 2, wherein said second keyed hash is computed over a string generated by concatenating said first value, said second value, and said identification information of said second correspondent.

10. The method according to claim 4 further comprising:
    h) said second correspondent computing said second verification keyed hash; and
    i) said second correspondent verifying that said second verification keyed hash is equal to said second keyed hash.

11. The method according to claim 3, wherein said shared key is computed using a combination of a first random exponent generated by said first correspondent and a second random exponent received from said second correspondent.

12. The method according to claim 11, wherein said combination includes a concatenation of said first and second random exponents and said shared key is computed by hashing said concatenation.

13. The method according to claim 3, wherein said first keyed hash is computed over a string generated by concatenating said first value, said second value, and said identification information of said first correspondent.

14. The method according to claim 4, wherein said second keyed hash is computed over a string generated by concatenating said first value, said second value, and said identification information of said second correspondent.

15. A correspondent in a data communication system comprising a cryptographic unit for performing cryptographic operations; and a computer readable medium having computer readable instructions thereon for causing:
    a) said correspondent to generate a first value and send said first value to another correspondent;
    b) said correspondent to obtain a shared key;
    c) said correspondent to receive from said another correspondent: i) a first keyed hash of said first value, a second value generated by said another correspondent, and identification information of said correspondent using said shared key; ii) said identification information of said correspondent; and iii) said second value;

d) said cryptographic unit to compute a first verification keyed hash of said first and second values and said identification information of said correspondent using said shared key; and e) said correspondent to verify that said first keyed hash is equal to said first verification keyed hash.

16. The correspondent according to claim 15, wherein said computer readable instructions are further configured for causing:

f) said cryptographic unit to compute a second keyed hash of said first and second values and identification information of said another correspondent; and g) said correspondent to send said second keyed hash and said identification information of said another correspondent to said another correspondent to enable said another correspondent to compute a second verification keyed hash of said first and second values and identification information of said another correspondent, and to verify that said second verification keyed hash is equal to said second keyed hash.

17. The correspondent according to claim 15, wherein said shared key is computed using a combination of a first random exponent generated by said correspondent and a second random exponent received from said another correspondent.

18. The correspondent according to claim 17, wherein said combination includes a concatenation of said first and second random exponents and said shared key is computed by hashing said concatenation.

19. The correspondent according to claim 15, wherein said first keyed hash is computed over a string generated by concatenating said first value, said second value, and said identification information of said correspondent.

20. The correspondent according to claim 16, wherein said second keyed hash is computed over a string generated by concatenating said first value, said second value, and said identification information of said another correspondent.

21. The correspondent according to claim 15 further comprising a public and private key pair in a public key encryption system, wherein said cryptographic unit is configured for authenticated key agreement between said correspondent and said another correspondent, and wherein said shared key is computed from public information of said another correspondent and information that is private to said correspondent.

22. A data communication system comprising:

a first correspondent comprising a first cryptographic unit for performing cryptographic operations; and a first computer readable medium having computer readable instructions thereon for causing:

a) said first correspondent to generate a first value and send said first value to a second correspondent;

b) said first correspondent to obtain a shared key;

c) said first correspondent to receive from said second correspondent: i) a first keyed hash of said first value, a second value generated by said second correspondent, and identification information of said first correspondent using said shared key; ii) said identification information of said first correspondent; and iii) said second value;

d) said first cryptographic unit to compute a first verification keyed hash of said first and second values and said identification information of said first correspondent using said shared key;

e) said first correspondent to verify that said first keyed hash is equal to said first verification keyed hash;

f) said first cryptographic unit to compute a second keyed hash of said first and second values and identification information of said second correspondent; and g) said first correspondent to send said second keyed hash and said identification information of said second correspondent to said second correspondent; and a second correspondent comprising a second cryptographic unit for performing cryptographic operations; and a second computer readable medium having computer readable instructions thereon for causing:

h) said second correspondent to compute a second verification keyed hash of said first and second values and identification information of said second correspondent; and i) said second correspondent to verify that said second verification keyed hash is equal to said second keyed hash.

* * * * *